United States Patent Office 3,476,745
Patented Nov. 4, 1969

3,476,745
6,6-ETHYLENE CORTICOIDS
Vlasios Georgian, Belmont, Mass., and James F. Kerwin, Broomall, Pa., assignors to Smith Kline & French Laboratories, Philadelphia, Pa., a corporation of Pennsylvania
No Drawing. Filed June 4, 1965, Ser. No. 461,544
Int. Cl. C07c *169/34, 173/00;* A61k *27/00*
U.S. Cl. 260—239.55                           6 Claims

ABSTRACT OF THE DISCLOSURE 6,6-ethylenepregn-4-ene-3,20-diones, oxygenated at the 11, 17, and 21-positions and optionally substituted at the 1, 2, 4, 9, and 16-positions, are prepared by the basic reaction of a suitable 6-methylene compound and dimethyl sulfoxonium methylide. The products are antiinflammatory agents.

---

This invention relates to steroid compounds having potent antiinflammatory activity. In particular, the invention relates to 6,6-ethylenepregnene compounds.

The compounds of the invention are characterized principally by the presence of a 6,6-ethylene group, which may also be described as a 6-spirocyclopropyl group. They are further characterized by the presence of the $\Delta^4$-3-keto system, hydroxy groups at the 17$\alpha$ and 21-positions, a 20-keto group, and certain optional groups at the 1, 2, 4, 9, 11, and 16-positions. They may thus be represented by the following structural formula:

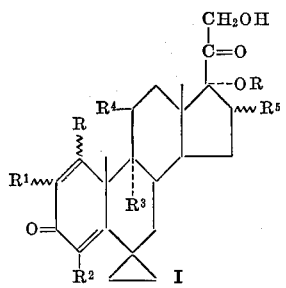

wherein:

R is hydrogen or methyl;
$R^1$ is hydrogen, fluoro or methyl;
$R^2$ is hydrogen or methyl;
$R^3$ is hydrogen, fluoro or methyl;
$R^4$ is hydroxy or keto; and
$R^5$ is hydrogen, fluoro, methyl, hydroxy, or lower alkanoyloxy.

The dotted line between the 1 and 2-positions represents an optional double bond.

Preferred compounds of the invention are 6,6-ethylenehydrocortisone and 6,6-ethylene-9$\alpha$-fluoro-11$\beta$,16$\alpha$,17$\alpha$,21-tetrahydroxypregna-1,4-diene-3,20-dione.

The term lower alkanoyl is intended to represent those groups of up to about five carbon atoms therein, particularly acetyl, propionyl, butyryl, or caproyl.

In the above structural formula, the wavy lines at positions 1, 2, and 16 indicate either an $\alpha$ or $\beta$-configuration.

The compounds of the present invention are prepared generally from the corresponding 6-methylene steroids by a reagent which is capable of adding a methylene group across the 6-methylene double bond. A suitable reagent is dimethylsulfoxonium methylide,

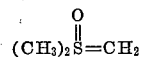

the Corey reagent, which is formed in situ by reaction of dimethyl sulfoxide methiodide with a strong base such as sodium hydride. Prior to treatment with this reagent, it is desirable to protect the 17,20,21-oxygenated system by conversion to the bismethylenedioxy derivative. Following formation of the 6,6-ethylene grouping, the bismethylenedioxy system is hydrolyzed by means of an acid such as 50% acetic acid or 50% formic acid.

The 6-methylene-17$\alpha$,20:20,21-bismethylenedioxy starting materials are either known to the art or are readily prepared from known starting materials by methods known to the art, particularly as described in U.S. Patents 3,095,411, 3,112,305, and 3,159,643. The preferred method of preparing a 6-methylene starting material comprises formation of a 3-enol ether of a 17$\alpha$,20:20,21-bismethylenedioxy-$\Delta^4$-3-keto steroid by treatment with a reagent such as ethyl orthoformate in the presence of an acid catalyst such as p-toluenesulfonic acid. The resulting 3,5-diene is formylated at the 6-position by treatment with the Vilsmeier reagent. This reagent, which consists of phosgene and dimethylformamide, reacts in an anhydrous medium with the diene at position 6 to give an iminium intermediate which is then hydrolyzed to the 6-formyl compound. The formyl group is then reduced either catalytically or by means of lithium or sodium borohydride or lithium aluminum hydride to give the 6-hydroxymethyl compound, and this group is dehydrated with a reagent such as glacial acetic acid, p-toluenesulfonic acid, or sulfuric acid to give the 6-methylene compound.

The nature of the 11-oxygenated group in the final product is dependent upon the starting material used and the particular reagents and reactions employed in the formation of the 6,6-ethylene system. When a 6-methylene starting material is employed, the 11-group of the final product will be the same as in the starting material. An 11-keto (cortisone-type) product may be reduced to an 11$\beta$-hydroxy compound (hydrocortisone-type) with lithium aluminum hydride in tetrahydrofuran. The 20-keto group should be protected, preferably as its bismethylenedioxy derivative. The 3-keto group should also be protected, either as an enol ether or a ketal. Failure to protect the 3-keto group during reduction of the 11-keto group with lithium aluminum hydride results in reduction to a 3-hydroxy group. This alcohol can be oxidized back to a 3-ketone by treatment with 2,3-dichloro-5,6-dicyanobenzoquinone.

When the starting material lacks the 6-methylene group, introduction of this group requires, among other reactions, reduction of a 6-formyl group. If an 11-hydroxy product is desired, the reduction of the formyl group may be accomplished with lithium aluminum hydride. If an 11-keto product is desired, the reduction of the formyl group is best accomplished with a reagent which will not affect the 11-keto group. Such reagents include lithium or sodium borohydride in tetrahydrofuran or hydrogen over a Raney nickel or platinum or charcoal catalyst in methanol.

It is often desirable to esterify a 16 or 21-hydroxy group by means of an acid halide or anhydride to obtain the lower alkanoyl ester. These esters are useful for protecting the hydroxy groups from undesired transformations or, therapeutically, for achieving longer-lasting effects or different physiological adsorption characteristics. When used as a protective group, such an ester is readily hydrolyzed by known methods, for example, hydrolysis with aqueous potassium carbonate.

A 16$\alpha$,17$\alpha$-acetonide having the 6,6-ethylene grouping is prepared by using a starting material such as the known 3-enol ether 3 - methoxy - 9$\alpha$-fluoro-11$\beta$,21-dihydroxy - 16$\alpha$,17$\alpha$ - isopropylidenedioxypregna-3,5-dien-20-one, 21-acetate. The 6-methylene group is introduced as described above, and the 6,6-ethylene system then generated.

Compounds having a 1,2-double bond are prepared either by using as a starting material a known compound which already possesses this system of unsaturation, or else by introducing the double bond after the 6,6-ethylene group has been generated. A preferred reagent for this purpose is 2,3-dichloro-5,6-dicyanobenzoquinone, and the dehydrogenation reaction is best carried out with the 21-hydroxy group protected by formation of its acetate, or as part of a bismethylenedioxy grouping. Microorganisms are also well known for their 1,2-dehydrogenating properties.

The novel compounds of this invention may be administered orally, parenterally, or topically in conventional dosage forms such as tablets, capsules, ointments, injectables, or the like, by incorporating an effective, but nontoxic dose of the compound into standard pharmaceutical carriers according to accepted practice.

The following examples are intended to illustrate the preparation of compounds of the invention, but are not to be construed as limiting the scope thereof.

EXAMPLE 1

6,6-ethylenehydrocortisone

Five grams of 6-methylene-11$\beta$-hydroxy-17$\alpha$,20:20,21-bismethylenedioxypregn-4-en-3-one (U.S. Patent No. 3,112,305) in 100 ml. of dimethyl sulfoxide is added dropwise to a mixture of 0.63 g. of sodium hydride (53% suspension in mineral oil) and 3.08 g. of dimethyl sulfoxide methiodide in 25 ml. of dimethyl sulfoxide. The clear reaction mixture is stirred for 45 minutes at room temperature and then 1 hour at 50–55°. The cooled mixture is diluted with water and extracted with methylene chloride. The organic phase is washed with water, dried and evaporated. Recrystallization of the residue from acetone-hexane gives 6,6-ethylene-11$\beta$-hydroxy-17$\alpha$,20:20, 21-bismethylenedioxypregn-4-en-3-one, M.P. 220–228°; $\lambda$max. 248 m$\mu$.

The above material is heated in 100 ml. of 50% aqueous acetic acid at 100° for 3 hours. The reaction mixture is diluted with water and extracted with methylene chloride. The organic solution is washed with sodium bicarbonate solution and water, dried and evaporated. The crude material is recrystallized from chloroform and methanol and then chromatographed on a silica column. Elution with benzene-ethyl acetate (1:1) gives 6,6-ethylene hydrocortisone, which, after recrystallization from methylene chloride, melts at 221–224°; $\lambda$max. 248 m$\mu$.

EXAMPLE 2

6,6-ethylene-16$\alpha$-methylcortisone

Five grams of 6-methylene-16$\alpha$-methyl-17$\alpha$,20:20,21-bismethylenedioxypregn-4-ene-3,11-dione (U.S. Patent No. 3,074,935) in 100 ml. of dimethyl sulfoxide is added to a mixture of sodium hydride, dimethyl sulfoxide methiodide, and dimethyl sulfoxide according to the procedure of Example 1. The resulting 6,6-ethylene-16$\alpha$-methyl-17$\alpha$, 20:20,21-bismethylenedioxypregn-4-ene-3,11-dione is hydrolyzed with 50% aqueous acetic acid according to the procedure of Example 1 to obtain the title product.

EXAMPLE 3

6,6-ethylene-16$\alpha$-methylhydrocortisone

A solution of 2 g. of 6,6-ethylene-16$\alpha$-methyl-17$\alpha$, 20:20,21-bismethylenedioxypregn-4-ene-3,11-dione in 50 ml. of tetrahydrofuran is added to a suspension of an excess of lithium aluminum hydride in tetrahydrofuran and the mixture is refluxed for several hours. Aqueous methanol is added to the cooled solution to decompose the excess hydride. The solution is then filtered and the solvents evaporated to give 6,6-ethylene-16$\alpha$-methyl-17$\alpha$, 20:20,21-bismethylene-dioxypregn-4-ene-3,11$\beta$-diol.

The diol (5.3 g.) is dissolved in 25 ml. of dioxane and treated with a solution of 2.27 g. of 2,3-dichloro-5,6-dicyanobenzoquinone in 25 ml. of dioxane. After standing for 18 hours at room temperature, the solution is filtered and the solvent evaporated. The residue is then purified by recrystallization to give the bismethylenedioxy derivative of the title product. Hydrolysis with 50% aqueous acetic acid according to the procedure of Example 1 gives the title product.

EXAMPLE 4

6,6-ethylene-4-methylcortisone

A solution of 5 grams of 6-methylene-4-methyl-17$\alpha$, 20:20,21 - bismethylenedioxypregn - 4 - ene - 3,11-dione [J. Org. Chem. 26, 976–9 (1961)] in 100 ml. of dimethyl sulfoxide is added to a mixture of sodium hydride, dimethyl sulfoxide methiodide, and dimethyl sulfoxide according to the procedure of Example 1. The bismethylenedioxy system of the resulting 6,6-ethylene compound is hydrolyzed with 50% aqueous acetic acid as in Example 1 to give the title product.

EXAMPLE 5

6,6-ethylenecortisone

A solution of 5 grams of 6-methylene-17$\alpha$,20:20,21-bismethylenedioxypregn-4-ene-3,11-dione in 100 ml. of dimethyl sulfoxide is added to a mixture of sodium hydride, dimethyl sulfoxide, and dimethyl sulfoxide methiodide according to the procedure of Example 1. The resulting 6,6-ethylene bismethylenedioxy compound is hydrolyzed with 50% aqueous acetic acid as in Example 1 to obtain the title product.

EXAMPLE 6

6,6-ethylene-9$\alpha$-fluorohydrocortisone

Ten grams of 9$\alpha$-fluoro-17$\alpha$,20:20,21-bismethylenedioxypregn-4-ene-3,11-dione (U.S. Patent No. 3,049,554) is stirred in 100 ml. of dioxane containing 0.5 g. of p-toluene-sulfonic acid and 10 g. of triethylorthoformate. The mixture is stirred until a clear solution results (ca. 20 min.). Several milliliters of pyridine are added and then water is added to precipitate the 3-ethoxy-3,5-diene product, which is collected and dried.

A solution of 2.0 g. of phosgene in 30 ml. of ethylene dichloride is added dropwise over 15–20 minutes to a stirred solution of 6 ml. of dimethylformamide in 20 ml. of ethylene dichloride at 0–5°. After stirring for 10 additional minutes, 6 g. of 3-ethoxy-17$\alpha$,20:20,21-bismethylenedioxy-9$\alpha$-fluoropregna-3,5-dien-11-one in 50 ml. of ethylene dichloride containing several drops of pyridine is added all at once and stirring continued for 2 hours while the mixture slowly comes to room temperature.

5 sodium acetate solution (80 ml.) is added, stirring continued for 10 minutes, and the reaction mixture poured into water. The mixture is extracted with methylene chloride and the organic phase is washed, dried and evaporated to give the 6-formyl product.

The 6-formyl compound (19.2 g.) dissolved in 200 ml. of tetrahydrofuran is added slowly to 3 g. of lithium aluminum hydride in 50 ml. of tetrahydrofuran. The mixture is stirred and refluxed for 2 hours. Water (4 ml.) is added to the cooled mixture and inorganic salts filtered off. Concentration of the filtrate gives 6-hydroxymethyl-3-ethoxy - 17$\alpha$,20:20,21-bismethylenedioxy-9$\alpha$-fluoropregna-3,5-dien-11$\beta$-ol.

Seven grams of the 6-hydroxymethyl compound in 70 ml. of 80 aqueous acetic acid is heated on the steam bath for 30 minutes. The solution is diluted with water and extracted with methylene chloride. The organic phase is washed with sodium bicarbonate solution and water, dried and evaporated. Chromatography of the crude product on silica gives 6-methylene-17$\alpha$,20:20,21-bismethylenedioxy-9$\alpha$-fluoro-11$\beta$-hydroxypregn-4-en-3-one.

Five grams of the 6-methylene compound in 100 ml. of dimethyl sulfoxide is added to a mixture of sodium hydride, dimethyl sulfoxide methiodide, and dimethyl sulfoxide according to the procedure of Example 1. The resulting 6,6-ethylene bismethylenedioxy compound is hydrolyzed with 50% aqueous acetic acid according to the procedure of Example 1 to give 6,6-ethylene-9α-fluorohydrocortisone.

EXAMPLE 7

6-6-ethylene-9α-fluoro-16α-methylhydrocortisone

When 9α-fluoro-16α-methyl - 17α,20:20,21 - bismethylenedioxypregn-4-ene-3,11-dione [J. Am. Chem. Soc. 85, 120–2 (1963)] is subjected, according to the procedures of Example 6, to the series of reactions involving enol ether formation, the Vilsmeier reaction, reduction of the formyl group, dehydration of the hydroxymethyl group, reaction with the Corey reagent, and finally hydrolysis of the bismethylenedioxy group, the title product is obtained.

EXAMPLE 8

When the following starting materials are subjected to the same series of reactions as are described in Examples 6 and 7, the following products are obtained.

Starting material:
    9α,16β-difluoro-11β-hydroxy,17α, 20:20,21 - bismethylenedioxypregn-4-en-3-one (U.S. 2,980,670)
Product:
    6,6-ethylene-9α,16β-difluorohydrocortisone
Starting material:
    16β-methyl-17α,20:20,21 - bismethylenedioxypregn - 4-ene-3,11-dione [J. Am. Chem. Soc. 82, 4012 (1960)]
Product:
    6,6-ethylene-16β-methylhydrocortisone
Starting material:
    2α,16β-dimethyl-11β-hydroxy-17α,20:20,21 - bismethylenedioxypregn-4-en-3-one (U.S. 2,935,511)
Product:
    6,6-ethylene-2α,16β-dimethylhydrocortisone
Starting material:
    2α - fluoro-17α,20:20,21-bismethylenedioxypregn-4-ene-3,11-dione (British 933,868)
Product:
    6,6-ethylene-2α-fluorohydrocortisone
Starting material:
    1α-methyl-17α,20:20,21-bismethylenedioxypregn-4-ene-3,11-dione [Ber. 96, 2765 (1963)]
Product:
    6,6-ethylene-1α-methylhydrocortisone
Starting material:
    1β-methyl-11β-hydroxy-17α,20:20,21 - bismethylenedioxypregn-4-en-3-one [Compt. Rend. 257, 1946–7 (1963)]
Product:
    6,6-ethylene-1β-methylhydrocortisone
Starting material:
    2α-methyl-17α,20:20,21-bismethylenedioxypregn-4-ene-3,11-dione [Anal. Chem. 34, 1548–51 (1962)]
Product:
    6,6-ethylene-2α-methylhydrocortisone
Starting material:
    9α-methyl-11β-hydroxy-17α,20:20, 21 - bismethylenedioxypregn-4-en-3-one [J. Org. Chem. 26, 2426–31 (1961)]
Product:
    6,6-ethylene-9α-methylhydrocortisone

EXAMPLE 9

6,6-ethylene-9α-fluoro-11β,16α,17α,21-tetrahydroxypregn-4-ene-3,20-dione

3 - methoxy - 9α - fluoro - 11β,16α,17α,21 - tetrahydroxypregna-3,5-dien-20-one, 16,21-diacetate [J. Org. Chem. 28, 760 (1963)] is treated with the Vilsmeier reagent as in Example 6 to give the 6-formly compound.

One gram of this 6-formyl compound is hydrogenated in 15 ml. of ethanol containing 0.5 g. of sodium acetate over 0.3 g. of a 5% platinum-charcoal catalyst until one mole of hydrogen is absorbed. The catalyst is filtered off, and the solution poured into water. The precipitated 6-hydroxymethyl product is filtered off and recrystallized from aqueous methanol.

The above 6-hydroxymethyl 3,5-diene compound (0.5 g.) is heated in 5 ml. of 90% aqueous acetic acid at 80–90° for 10 minutes. Water is thent added until the product precipitates. The product 6-methylene-$\Delta^4$-3-ketone is then converted to 6,6-ethylene-9α-fluoro-11β,16α,17α,21-tetrahydroxypregn-4-ene-3,20 - dione, 16,21 - diacetate by treatment with the Corey reagent as in Example 1.

One gram of the diacetate in 50 ml. of methanol is hydrolyzed by treatment under nitrogen for 1 hour with a solution of 5 ml. of 10% aqueous potassium carbonate. The solution is neutralized with acetic acid and poured into water, and the title product isolated by extraction.

EXAMPLE 10

6,6-ethylene-9α-fluoro-11β,16α,17α,21-tetrahydroxypregna-1,4-diene-3,20-dione

A solution of 2.5 g. of 6,6-ethylene-9α-fluoro-11β,16α,17α,21-tetrahydroxypregn-4-ene-3,20-dione, 16,21-diacetate and 1.5 g. of 2,3-dichloro-5,6-dicyanobenzoquinone in 50 ml. of dioxane is refluxed ca. 18 hours. The solution is filtered, the filtrate evaporated to dryness, and the residue taken up in ethyl acetate. The solution is washed with water, cold 1% sodium hydroxide solution, and again with water, and then dried and evaporated to give the 1,4-pregnadiene diacetate.

This compound is then hydrolyzed with potassium carbonate as in Example 9 to give the title compound.

EXAMPLE 11

6,6-ethylene-9α,fluoro-11β,21-dihydroxy-16α,17α-isopropylidenedioxypregn-4-ene-3,20-dione 3 - methoxy - 9α - fluoro - 11β,21 - dihydroxy - 16α, 17α-isopropylidenedioxypregna-3,5-dien-20-one, 21-acetate [J. Org. Chem. 28, 760 (1963)] is converted to 6,6-ethylene - 9α - fluoro - 11β,21 - dihydroxy - 16α,17α-isopropylidenedioxypregn-4-ene-3,20-dione, 21-acetate according to the procedures of Example 9. The acetate group is then hydrolyzed to the title product with potassium carbonate according to the procedure of Example 9.

EXAMPLE 12

6,6-ethylene-9α-fluoro-11β,21-dihydroxy-16α,17α-isopropylidenedioxypregna-1,4-diene-3,20-dione 6,6 - ethylene - 9α - fluoro - 11β,21 - dihydroxy - 16α, 17α - isopropylidenedioxypregn - 4 - ene - 3,20 - dione, 21-acetate is oxidized with dichlorodicyanobenzoquinone according to the procedure of Example 10, and then hydrolyzed to the title product with potassium carbonate according to the procedure of Example 9.

EXAMPLE 13

6,6-ethylene-11β,17α,21-trihydroxypregna-1,4-diene-3,20-dione

A solution of 2.2 g. of 6,6-ethylene-11β-hydroxy-17α,20:20,21-bismethylenedioxypregn-4-en-3-one and 1.5 g. of 2,3-dichloro-5,6-dicyanobenzoquinone in 50 ml. of dioxane is refluxed for ca. 18 hours. The solution is filtered, the filtrate evaporated to dryness, and the residue taken up in ethyl acetate. The solution is washed with water, cold 1% sodium hydroxide solution, and again with water, and then dried and evaporated to give the 1,4-pregnadiene bismethylenedioxy derivative.

This compound is then hydrolyzed with 50% aqueous acetic acid according to the procedure of Example 1 to give the title product.

EXAMPLE 14

6,6-ethylene-16α-methyl-11β,17α,21-trihydroxypregna-1,4-diene-3,20-dione

A solution of 2.1 g. of 6,6-ethylene-11β-hydroxy-16α-methyl - 17α,20:20,21 - bismethylenedioxypregn - 4 - en- 3-one and 1.5 g. of 2,3-dichloro-5,6-dicyanobenzoquinone in 50 ml. of dioxane is refluxed for ca. 18 hours and the reaction mixture worked up as in Example 13. The resulting 1,4-pregnadiene bismethylenedioxy derivative is then hydrolyzed with 50% aqueous acetic acid as in Example 1 to give the title product.

EXAMPLE 15

6,6-ethylene-9α-fluoro-16α-methyl-11β,17α,21-trihydroxy-pregna-1,4-diene-3,20-dione A solution of 2.2 g. of 6,6-ethylene-9α-fluoro-16α-methyl - 11β - hydroxy - 17α,20:20,21 - bismethylenedioxypregn-4-en-3-one and 1.5 g. of 2,3-dichloro-5,6-dicyanobenzoquinone in 50 ml. of dioxane is refluxed for ca. 18 hours and the reaction mixture worked up as in Example 13. The resulting 1,4-pregnadiene bismethylenedioxy derivative is then hydrolyzed with 50% aqueous acetic acid as in Example 1 to give the title product.

We claim:
1.

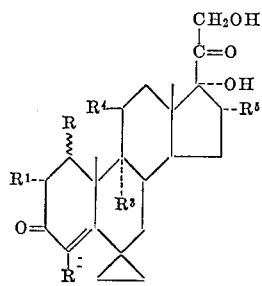

and the Δ¹ analogs thereof, wherein:
- R is selected from the group consisting of hydrogen and methyl;
- $R^1$ is selected from the group consisting of hydrogen and fluoro;
- $R^2$ is selected from the group consisting of hydrogen and methyl;
- $R^3$ is selected from the group consisting of hydrogen, fluoro and methyl;
- $R^4$ is selected from the group consisting of hydroxy and keto; and
- $R^5$ is selected from the group consisting of hydrogen, hydroxy and lower alkanoyloxy, with the proviso that R, $R^1$, $R^2$, $R^3$, and $R^5$ all are not hydrogen at the same time and $R^3$ is not fluoro when R, $R^1$, $R^2$, and $R^5$ are all hydrogen.

2. 6,6 - ethylene - 9α - fluoro - 11β,16α,17α,21-tetrahydroxypregna-1,4-diene-3,20-dione.

3. 6,6 - ethylene - 9α - fluoro - 11β,21 - dihydroxy-16α,17α-isopropylidenedioxypregna-1,4-diene,3,20-dione.

4. 6,6 - ethylene - 9α - fluoro - 11β,21 - dihydroxy-16α,17α-isopropylidenedioxypregn-4-ene-3,20-dione.

5. 6,6 - ethylene - 9α - fluoro - 11β,16α,17α,21-tetrahydroxypregn-4-en-3,20-dione.

6. 6,6-ethylene-9α-methylhydrocortisone.

References Cited

UNITED STATES PATENTS 3,261,829   7/1966   Colton et al.

HENRY A. FRENCH, Primary Examiner

U.S. Cl. X.R.
260—397.45, 999